United States Patent
Voser et al.

(10) Patent No.: US 6,587,737 B2
(45) Date of Patent: Jul. 1, 2003

(54) METHOD FOR THE MONITORING OF A PLANT

(75) Inventors: Alexandre Voser, Zurich (CH); Heinz Güttinger, Schaffhausen (CH)

(73) Assignee: Sulzer Makert and Technology AG, Winterthur (CH)

( * ) Notice: Subject to any disclaimer, the term of this patent is extended or adjusted under 35 U.S.C. 154(b) by 165 days.

(21) Appl. No.: 09/923,865

(22) Filed: Aug. 6, 2001

(65) Prior Publication Data

US 2002/0052712 A1 May 2, 2002

(30) Foreign Application Priority Data

Sep. 14, 2000 (EP) .............................. 00810829

(51) Int. Cl.$^7$ .......................... G05B 13/02; G05B 17/02
(52) U.S. Cl. ................... 700/30; 700/29; 703/2
(58) Field of Search ................ 700/30, 29, 31, 700/33, 47, 52, 73, 80; 703/2, 7; 701/14

(56) References Cited

U.S. PATENT DOCUMENTS 5,713,007 A * 1/1998 Lecomte et al. ............... 701/14
6,208,953 B1 * 3/2001 Milek et al. .................... 703/7
6,473,658 B1 * 10/2002 Brose et al. ................... 700/31

FOREIGN PATENT DOCUMENTS

| DE | 196 35 033 A1 | 3/1998 |
|----|---------------|--------|
| EP | 0 537 041 A1  | 4/1993 |
| EP | 0 809 162 A2  | 11/1997 |
| EP | 0 895 197 A1  | 2/1999 |

* cited by examiner

Primary Examiner—Leo Picard
Assistant Examiner—Steven R. Garland
(74) Attorney, Agent, or Firm—Townsend and Townsend and Crew LLP

(57) ABSTRACT

A method is proposed for the monitoring of a plant having a plurality of sub-systems which is operable at variable working points. Respective measured values are detected for a fixed set of process parameters (B, U, S1, . . . , SN) at pre-settable time intervals during the operation of the plant (1). The measured values detected in a learning phase for different working points are used to prepare models (M1, M2, . . . , MN) for the operating characteristics of the sub-systems (11, 12, . . . , 1N). At least one monitoring parameter (Ri, Ri$_k$), which is independent of the respective current working point, is determined at pre-settable time intervals in an operating phase using the models (M1, M2, . . . , MN) and the time-dependent course of the monitoring parameter (Ri, Ri$_k$) is used for the monitoring of the plant (1). A pre-check (2) is carried out prior to the determination of the monitoring parameter (Ri, Ri$_k$), in which a check is made whether at least the measured values for those process parameters which are operating parameters (B) are within a pre-determined range.

12 Claims, 4 Drawing Sheets

METHOD FOR THE MONITORING OF A PLANT

Figure 1:
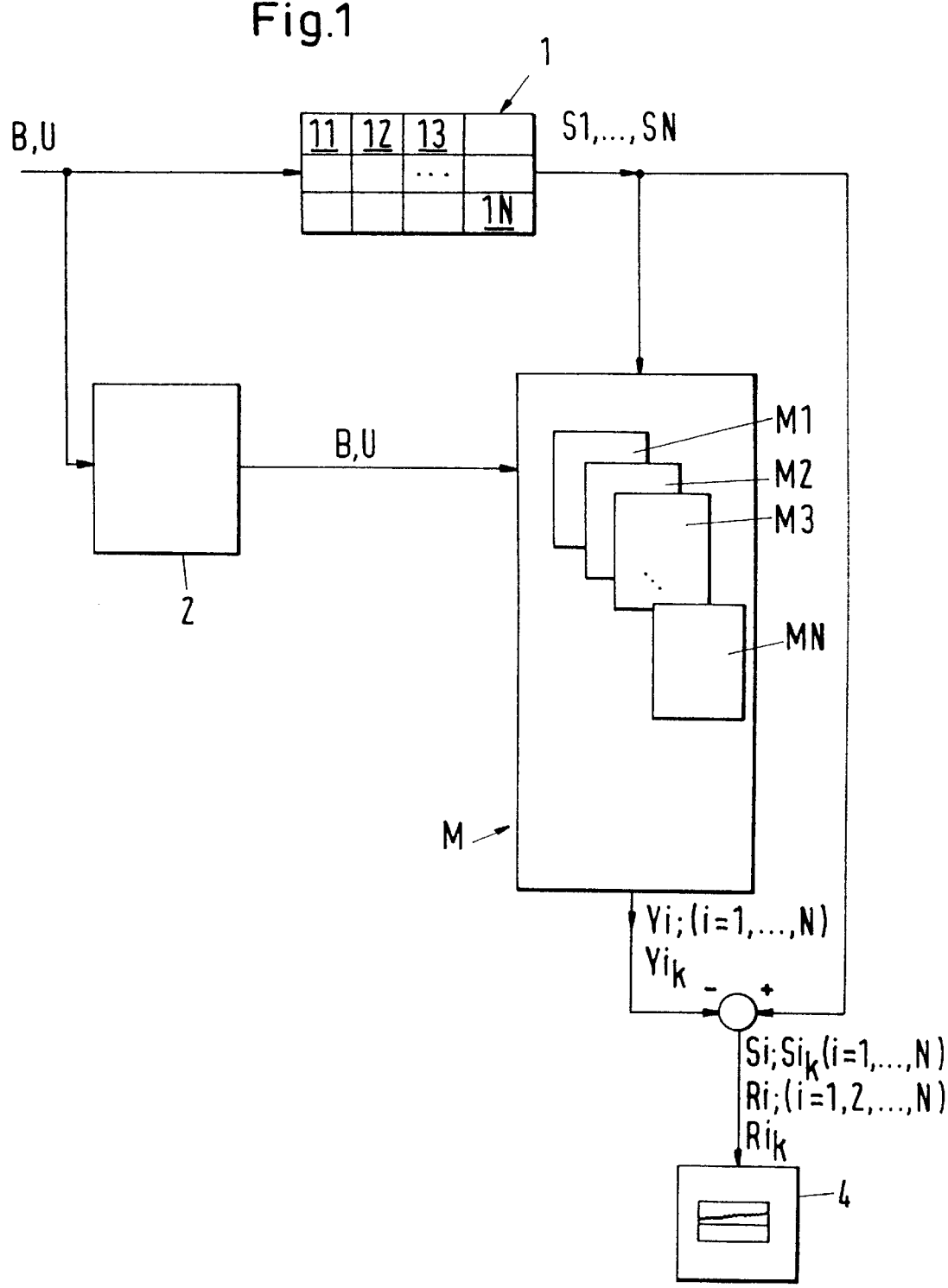

The invention relates to a method for the monitoring of a plant having a plurality of sub-systems in accordance with the preamble of the independent claim.

Plants such as hydroturbines or gas turbines with driving generators for the generation of electrical energy in power stations, turbocompressors and piston compressors to compress gases, pump stations or aeronautical engines are typically very complex systems which frequently work at different working points and whose respective operating status is influenced by a large number of process parameters. It is necessary, as a rule, to monitor the status of such plants in order to detect operating malfunctions, that is deviations from normal operating characteristics, at the earliest possible time or to monitor the state of wear of individual components so that necessary maintenance work can be planned in time and carried out efficiently.

It is, for example, possible for this purpose to inspect the plant at regular intervals. However, it is usually necessary to switch the plant off for this, which is disadvantageous from an economic aspect.

A plurality of process parameters such as, for example, pressure, temperatures at different points of the plant, flow rates, speeds, power, bearing temperatures, etc. is frequently determined by measurement and, for example, stored as a function of time or presented in graphical form. Such plants do not, however, usually work at a fixed operating or working point so that the time-dependent course of the measured parameters detected for the monitoring also shows great fluctuations in normal operation, that is operation free from malfunction. It is therefore only possible to judge whether the plant is working without malfunction with great difficulty—if at all—by using the time-dependent course of the measured parameters. While fixed threshold values can be set for some process parameters detected by measurement, with an alarm being triggered if these are not reached or exceeded, this procedure also causes the disadvantage due to the variable working points that false alarms are frequent or that actually existing operating malfunctions are not recognised in time. It is furthermore difficult to recognise and evaluate changes which take place very slowly over time such as occur, for example, due to operation-related wear.

It would be possible in principle to make a physical model of the whole plant, that is to calculate the physical relationships between the individual process parameters and then to carry out an evaluation of the operating status by a comparison of such physical model calculations and the parameters detected by measurement. However, this approach is frequently much too cost-intensive and complex in practice so that it is less suitable, in particular for industrial applications. One reason for this is that such plants have an enormous complexity with a plurality of sub-systems in mutual interaction with one another so that a more or less reliable physical model must consider a plurality of relationships between the individual process parameters, whereby its preparation is made into an extremely difficult task which is both time and cost intensive.

For this reason, a monitoring method is proposed in EP-A-0 895 197 which is based on an experimental modelling, that is without using a prior calculation of the physical relationships between the process parameters. Respective measured values are detected for a fixed set of process parameters at pre-settable time intervals. Measured values are detected for the process parameters for as many different working points as possible in a first, so-called modelling phase, with a check being made that the plant is working without malfunction during this modelling phase. An experimental model for the operating characteristics is prepared using the measured values detected during the modelling phase, with the input variables of the model being at least a part of the set of process parameters and with the output values comprising a model value for at least one of the process parameters. A respective residual value is determined by a comparison of the respective model value and the actual measured value of the modelling phase corresponding thereto and the model is optimised by determining model parameters such that a model error determinable from the residual values becomes minimal. A simple mathematical relationship, which as a rule has no physical significance, is usually selected as the model structure. When the modelling phase has been completed, the experimental model has thus "learned" how the plant, i.e. the individual process parameters, behaves at different working points.

In the second phase, the normal operating phase of the plant, at least one monitoring parameter, which is independent of the respective current working point, is determined at pre-settable time intervals using the model for the operating characteristics. This monitoring parameter is preferably the residual value resulting from the difference between the respective current measured value and the model value corresponding thereto. The time-dependent course of the monitoring parameter is used to evaluate the wear in the sub-systems of the plant and/or to detect operating malfunctions.

The method disclosed in EP-A-0 895 197 has the advantage that it essentially works without physical modelling and is therefore very simple and suitable for industrial applications. Moreover, it takes into account the respective current working point of the plant and can also recognise slowly progressing changes such as are caused, for example, by wear, at an early point. Complex plants can also be reliably monitored in this way. Furthermore, an efficient planning of the maintenance work is possible, which results in a reduction of maintenance and operating costs.

Even though the method in accordance with EP-A-0-895 197 has proved itself in practice, there is nevertheless a need for improvement. The isolation and identification of faulty process parameters is actually relatively difficult and costly. An unrecognised fault in a process parameter can result in the triggering of a false alarm, which represents a limitation, in particular under economic aspects.

It is therefore an object of the invention to modify and improve such a method for the monitoring of a plant having a plurality of sub-systems such that a fault in a process parameter is reliably recognisable, such that the faulty process parameter can be identified more easily and such that false alarms are avoided as much as possible.

The method which satisfies this object for the monitoring of a plant having a plurality of sub-systems which is operable at variable working points is characterised by the features of the independent claim. Advantageous measures and preferred embodiments of the invention can be seen from the dependent claims.

The method in accordance with the invention therefore comprises the following steps: respective measured values are detected for a fixed set of process parameters at pre-settable time intervals during the operation of the plant. The measured values detected in a learning phase for different working points are used to prepare models for the operating characteristics of the sub-systems, with the input values of each model being at least a part of the process parameters and the output value of each model comprising a model value for at least one of the process parameters, and with the models being optimised by comparing the model values with the measured values. At least one monitoring parameter, which is independent of the respective current working point, is determined at pre-settable time intervals in an operating phase using the models and the time-dependent course of the monitoring parameter is used for the monitoring of the plant. A pre-check is carried out prior to the determination of the monitoring parameter, in which a check is made whether at least the measured values for those process parameters which are operating parameters are within a pre-determined range.

The method in accordance with the invention is therefore based on the measured values for the operating parameters and/or the environmental parameters being subjected to a pre-check before they are used as input values for the specific models for the different sub-systems. Operating parameters are here understood to mean those process parameters which describe the operating status of the whole plant, i.e. which are not specific to an individual sub-system. Environmental parameters are understood to be those process parameters which are not influenced, at least not approximately influenced, by the operation of the plant, for example the air temperature outside the plant. Since at least one operating parameter is, as a rule, used in each specific model for the operating characteristics of a sub-system, the pre-check of the measured values for the operating parameters allows the use of faulty input values for the models of the sub-systems to be prevented. It is therefore ensured that only such models are evaluated for the sub-systems which have non-malfunctioning environmental and operating parameters as input values.

The diagnostic capability of the method is also substantially improved by this measure, since if now a deviation from the normal operating characteristics, e.g. a malfunction, an error or high wear, is detected by means of a model for a sub-system, it is certain that the error or the wear is actually present in this sub-system and that it is not due to a fault in an operating parameter. The probability of a false alarm is thus dramatically reduced.

As the operating parameters and/or the environmental parameters are examined for errors in the pre-check and the sub-systems are only then checked against the operating parameters and environmental parameters classified as free of malfunction, a simpler isolation of errors or error identification is also possible. That is, if the error is revealed in the pre-check, then one of the measured values of the operating parameters must be faulty, or an error has occurred in the determination of a measured value for an environmental parameter.

The method in accordance with the invention therefore carries out the monitoring more or less in two parts. First, the operating parameters which describe the operating status of the whole plant are examined in the pre-check and only then are the specific models for the operating characteristics of the sub-systems evaluated against the operating parameters classified as free of malfunctions. A reliable distinction can thus be made as to whether the deviation from the normal operating characteristics is caused only by one sub-system or by a plurality of sub-systems or by a fault associated with an operating parameter or an environmental parameter.

A machine model is preferably determined for the pre-check whose input values are operating parameters and whose output values comprise a machine model value for at least one of the operating parameters. Such a machine model actually represents a relatively simple and reliable method of checking the operating parameters for faults.

It is of advantage here if the machine model comprises at least one model with which a machine model value for the deviation of the measured value for an operating parameter is determined from a theoretically determined desired value for this operating parameter. The deviation of the respective current measured value from a theoretically determined desired value is therefore modelled by means of this model. Then this model value for the deviation is compared with the actual value of the deviation, it namely having been found that the deviation of the measured value from the theoretical value is substantially more easy to model and that such a model furnishes more reliable data.

The model for the deviation of the measured value from the theoretically determined desired value is preferably an experimental model which is prepared and optimised using the measured values detected in the learning phase.

The machine model can be prepared in the same or a similar way to the models for the operating characteristics of the sub-system. The machine model can therefore in particular be prepared using the measured values which are detected for various working points in the learning phase, with a deviation value being determined by a comparison of the machine model value with the actual measured value corresponding thereto, and with model parameters of the machine model being optimised such that a model error determinable from the deviation values becomes minimal.

The environmental parameters are preferably also examined for freedom from malfunction during the pre-check, for example by redundant measurement or by plausibility checks.

It is furthermore advantageous for the pre-check to comprise a range test in which a check is made whether individual operating parameters or combinations thereof are within the range of working points learned in the learning phase. It can actually be prevented in this way that "unlearned" states of the plant result in false warnings.

After the pre-check in the preferred embodiment, only the models for the sub-systems are evaluated in each case in which only process parameters are used for which no error or no malfunction is detected in the pre-check. Unnecessary calculation or evaluation time can be avoided with this measure.

It is a further advantageous measure if a confidence range is fixed at least for one monitoring parameter, if this confidence range can be extended if the monitoring parameter leaves the original confidence range, and if the extension of the confidence range is registered. The operator's attention is drawn to wear phenomena, for example, at an early point by this measure so that maintenance work can be scheduled in time.

Figure 2:
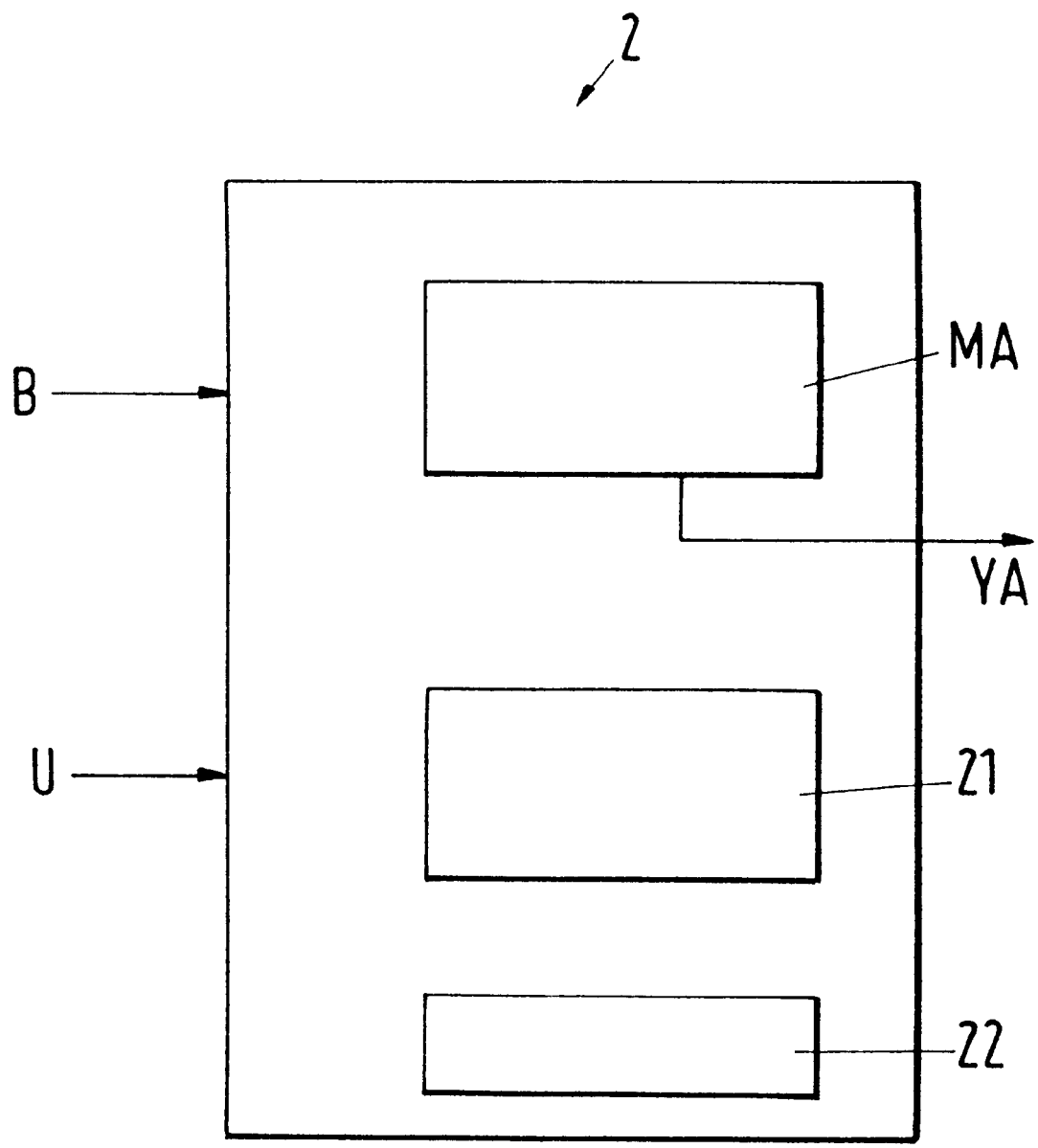
Figure 3:
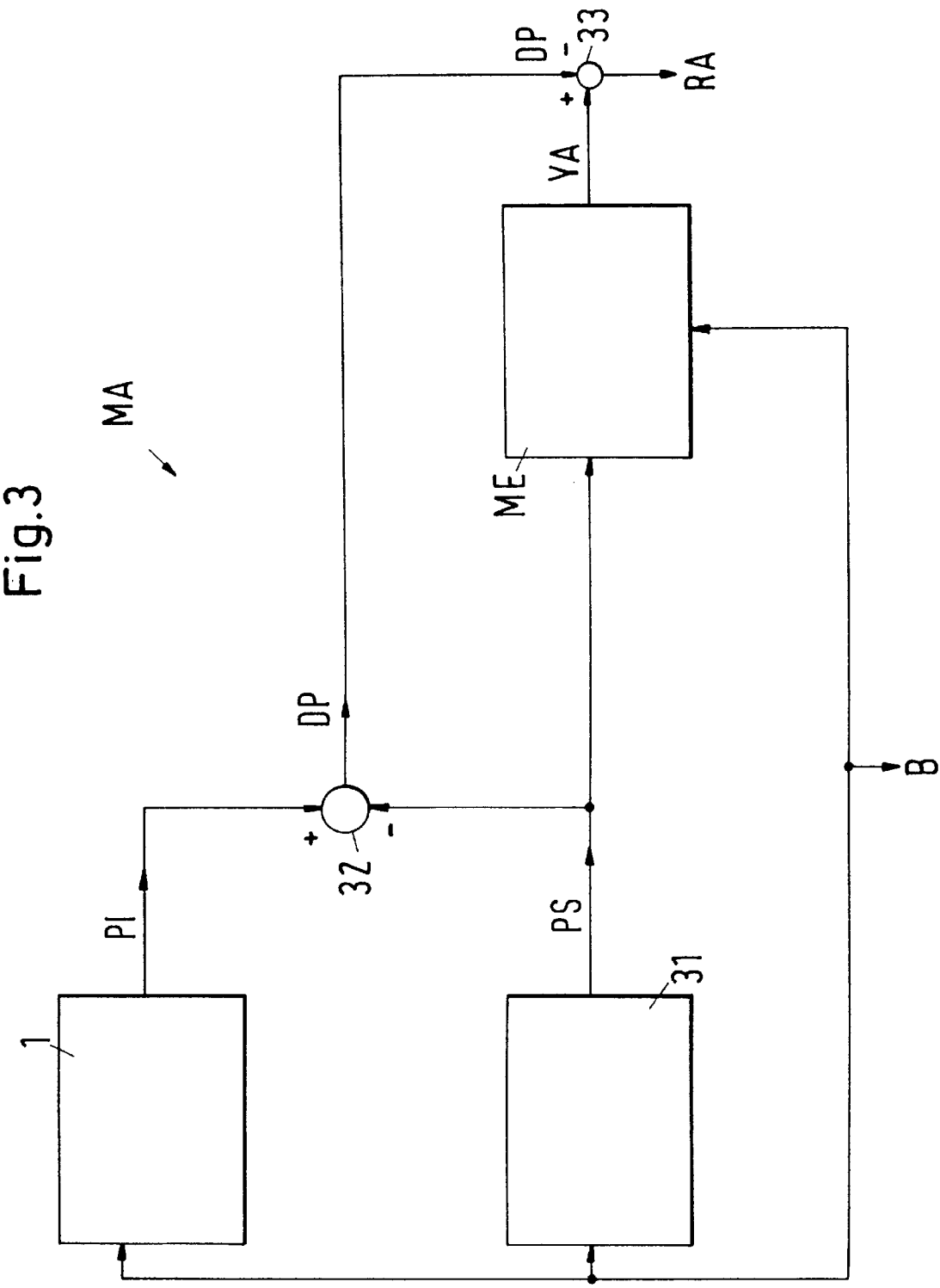

The invention is explained in more detail in the following by an example embodiment and with reference to the drawing. There are shown in the schematic drawing:

FIG. 1: a block diagram of an embodiment of the method in accordance with the invention;

FIG. 2 a block diagram for the pre-check in the embodiment of FIG. 1;

FIG. 3 a block diagram to illustrate an embodiment of a machine model; and

Figure 4:
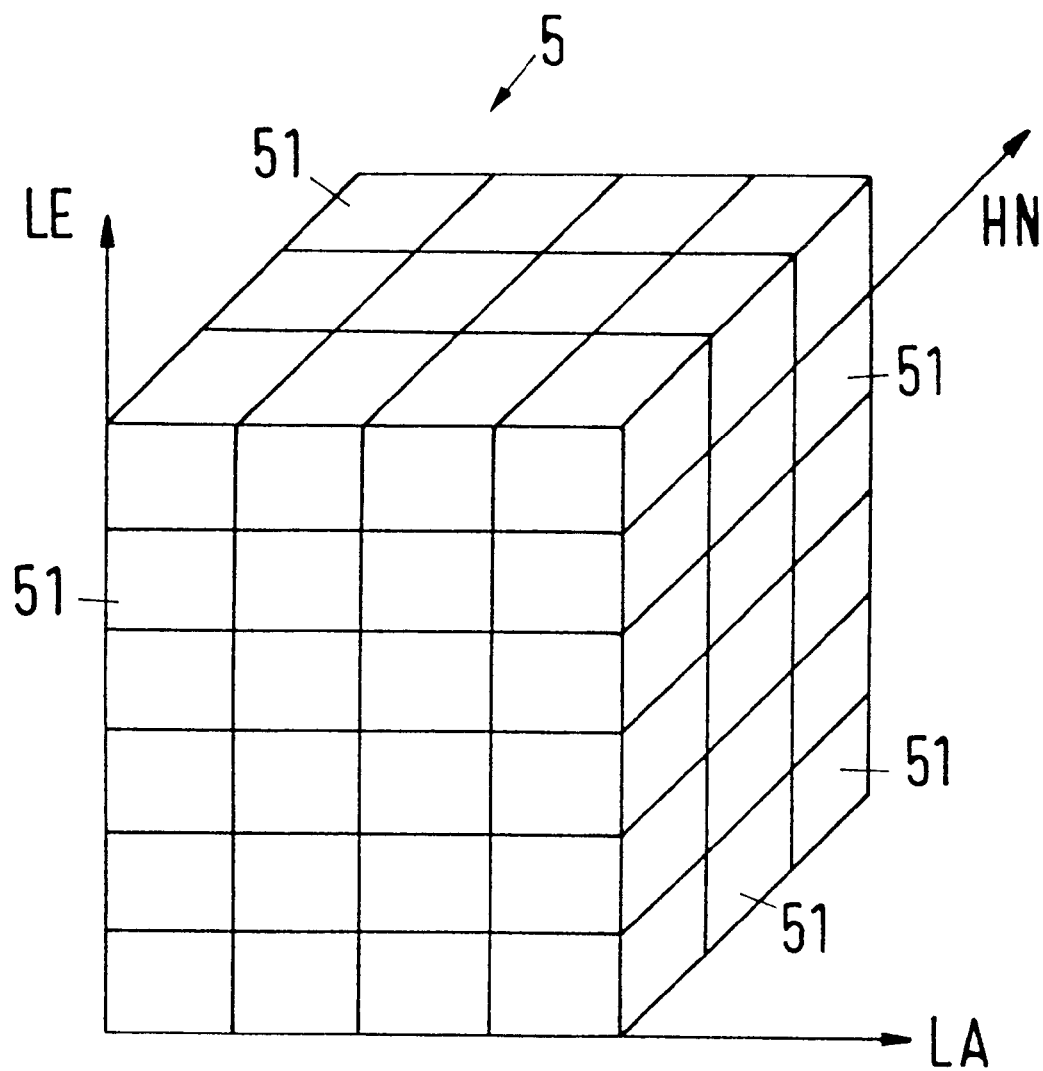

FIG. 4 a representation of an embodiment of a three-dimensional histogram.

In the following description, reference is made by way of example to the specific case of the plant to be monitored being a turbine with a generator driven thereby to generate electrical energy, such as is used in hydroelectric power stations. The invention is naturally not limited to such applications; the plant to be monitored can, for example, also be a gas turbine with attached generator, a turbocompressor or a piston compressor to compress gases, a pump station or an aeronautical engine.

The term "sub-system" is understood to mean parts of the plant, part systems or individual components which are described by process parameters between which there is a physical relationship. Such a sub-system can be a specific constructively contiguous component system, for example the component system "thrust bearing", which is characterised, for example, by different bearing temperatures as process parameters. However, it can also be a functionally related sub-system, for example the sub-system "cooled thrust bearing", which is characterised by further process parameters such as oil temperature, cooling water temperature and power in addition to the bearing temperatures.

The term "process parameter" is generally understood to mean a parameter from a totality of physical parameters, where said totality in this application describes the operating status of the plant and its part systems or sub-systems. The process parameters are therefore directly or indirectly detectable parameters which serve to characterise the operating status of the plant or its sub-systems or which have an influence on the operating status of the plant. The term process parameter comprises the following parameters, for example, with respect to the specific example of the turbine in the hydroelectric power station: power, guide wheel position, runner position, net head of water, pressure upstream and downstream of the turbine, water flow rate, water temperature, speed of the turbine, cooling medium temperature, temperature in the generator, temperatures in shaft bearings or shaft seals, sound emissions, vibrations, blade positions, etc. Some of the process parameters can be directly influenced by the operator, such as, for example, the water flow rate through the turbine; other process parameters, such as, for example, the temperature in the shaft bearings or in the shaft seal, can, in contrast, not be directly influenced. There is a plurality of process parameters which, however, are not all independent of one another, but as a rule have a strong correlation.

Three types of process parameters are distinguished, namely the environmental parameters, the operating parameters and the component parameters.

The environmental parameters are such process parameters which are not approximately influenced by the operation of the plant, for example the water temperature in the inflow or the air temperature outside the plant or the building in which the plant is located.

The operating parameters are those process parameters which describe the operating status of the whole plant. The operating parameters have the property of being approximately uncorrelated to the environmental parameters and of there being approximately statistical relationships between them. Examples for operating parameters are the power, the guide wheel position, the runner position, the head of water, the flow rate or the efficiency.

The component parameters are those process parameters which are not environmental parameters or operating parameters. They are parameters which are specific to a sub-system, for example bearing temperatures, process parameters which describe the oil lubrication and oil cooling systems, or the oil pressure. Component parameters can achieve the significance of operating parameters for a sub-system locally, that is limited to the sub-system which they describe.

"Working point" or "operating point" is understood to be that operating status at which the plant is currently working. Each combination of process parameters which can be realised with the plant corresponds to a working point. The totality of possible working points is termed the operating range. The working point of the plant is usually pre-settable by the operator by process parameters which can be directly influenced being set to the desired value. If, for example, the turbine is running in part load operation, it will be working at a different working point than in full load operation. The working point of the plant is fixed by the operating parameters and the environmental parameters.

FIG. 1 illustrates the concept of an embodiment of the method in accordance with the invention in a schematic block diagram. The plant to be monitored, that is here the turbine-generator unit, is designated as a whole by the reference numeral 1 and comprises a total of N sub-systems 11, 12, ..., 1N, with N being any natural number. Measured values are detected by means of sensors (not shown) during the operation of the plant 1 for a fixed set of process parameters B, U, S1, S2, ..., SN at pre-determinable time intervals, for example every minute or every 10 minutes. The process parameters B are operating parameters, for example, the flow rate, the runner position, the guide wheel position, the electric terminal power of the generator, the net head of water. The process parameters U are environmental parameters, for example the temperature of the ambient air or the water temperature in the inflow.

The process parameters $Si$ ($i=1, 2, \ldots, N$) are component parameters of the sub-system $1i$, such as, for example, bearing temperatures, coolant temperatures, vibrations, etc., that is Si designates the totality of the component parameters which serve to describe the sub-system $1i$.

As will be explained further below, the measured values for the process parameters detected for different working points in the learning phase are used to prepare models M1, M2, ..., MN for the operating characteristics of the sub-systems 11 to 1N, with the model Mi ($i=1, 2, \ldots, N$) describing the operating characteristics of the sub-system $1i$. Each of these models Mi has at least one, but normally a plurality of, the operating parameters B and, optionally, one or more environmental parameters U, as input values in addition to the component parameters Si of this sub-system $1i$. The operating parameters B are therefore used in a plurality or in all of the models MI. The output value of each model Mi comprises a model value Yi ($i=1, 2, \ldots, N$) for at least one of the process parameters which is the operating parameter Si for the sub-system $1i$. A model Mi is therefore prepared for each sub-system $1i$. The totality of the models Mi is designated by M in FIG. 1.

The respectively detected, current measured values for those component parameters Si which correspond to the computed model values Yi are compared with these model values during the operating phase of the plant 1 and monitoring parameters Ri ($i=1, 2, \ldots, N$) determined from these which are independent of the respective working point of the plant. The monitoring parameters Ri are preferably residual values in each case which result from the forming of the difference between the respectively current measured values for the component parameters Si and the associated model values Yi.

The time-dependent course of the monitoring parameters Ri is used for the monitoring and diagnosis of the plant. The time-dependent course of the monitoring parameters Ri is, for example, shown graphically on an output unit 4. The wear can be evaluated and operating malfunctions can be detected using the time-dependent course of the monitoring parameters Ri. Wear is here understood to mean operation-related changes which normally progress slowly, for example in the shaft bearing or in the shaft seals and, for example, deposits in lines or the contamination of filters. Operating malfunctions can, for example, be failures or malfunctions of one of the sensors or of the actuators they monitor (e.g. valves, control valves) or malfunctions in the plant 1 such as, for example, a change in vibrations or overheating of bearings or seals.

A pre-check is carried out in accordance with the invention prior to the determination of the monitoring parameters Ri, in which a check is made whether at least the measured values for those process parameters which are operating parameters B are within a pre-determined range. The efficiency of the method can be substantially increased by this measure. As the current measured values for the operating parameters B are checked in the operating phase of the plant 1 in each case before the models Mi for the sub-systems 1i are evaluated, it is prevented that errors in the operating parameters B are continued into the models Mi for the sub-systems 1i and result in false alarms or false diagnoses. Furthermore, the identification of faulty process parameters (fault isolation) is made possible reliably and simply by the pre-check 2 and the following working through of the models Mi for the sub-systems 1i. If, for instance, it is already detected in the pre-check 2 that one of the operating parameters B is faulty, then it is clear that this is not due to a specific error in one of the sub-systems 1i. If, in contrast, the error is only detected by one of the monitoring parameters Ri having an abnormal value, it can safely be assumed that the error is to be found in the sub-system 1i whose monitoring parameter Ri is outside the normal range.

The pre-check of the operating parameters B furthermore increases the reliability of the wear monitoring for the individual sub-systems 1i and thus substantially simplifies the scheduling of maintenance work.

From a time point of view, the method in accordance with the invention can be divided into two phases, namely into a learning phase and an operating phase. The learning phase serves to prepare the models Mi for the sub-systems 1i, and in the operating phase the plant 1 is monitored by means of the models Mi. It is explained in detail in the already cited EP A-0 895 197 how the models Mi for the sub-systems 1i can be determined by means of the measured values for the process parameters determined in the learning phase and will thus only be briefly outlined here. Reference is made to EP A-0 895 197, which is hereby incorporated in the present description, for more detailed information.

The models Mi (i=1, 2, ..., N) for the sub-systems 1i are models which are obtained directly from experimental data, that is from the measured values for the process parameters B, U, S1, ..., SN. Those measured values for the process parameters B, U, Si, ... SN, which are detected during the learning phase, are used to prepare the models Mi. The learning phase here designates a time-limited operating period of the plant 1 during which the plant 1 works in normal, that is non-malfunctioning, operation. The selection of the learning phase can be made on the basis of experience. For example, one can wait until typical running-in processes have been completed after the plant has been put into operation or been overhauled. The learning phase is selected to last so long that it comprises a plurality of different working points from the operating range of the plant 1, that is the plant is operated at many different working points during the learning phase, with it always being ensured by checks that the plant 1 is working without error during the learning phase or that only such measured values are used for the preparation of the models Mi where the plant 1 was working free of error or malfunction during their detection.

Measured values for the process parameters B, U, S1, ..., SN are collected during the learning phase. These measured values consequently relate to a plurality of different working points.

At least one of the component parameters, which is referred to as $Si_k$ in the following without limitation of generality, is selected from the set of component parameters Si, which describe the sub-system 1i, for the preparation of the model Mi of this sub-system 1i (i=1, 2, ..., N). A model value $Yi_k$ is determined for this component parameter $Si_k$ by means of the model Mi. At least some of the component parameters Si of this sub-system 1i and the operating parameters B and, optionally, also the environmental parameters U, are used as the input variables of the model Mi. For reasons of simplicity, the case is explained in the following by way of example that exactly one of the component parameters, namely $Si_k$, is the output value of the model Mi.

A plurality of sets $(B, U, Si)_T$ of measured values for the process parameters B, U, Si are collected and stored during the learning phase, with the index T indexing the measured value sets (B, U, Si) which follow on from one another in time.

A linear, static model structure is selected for the model Mi in the simplest case, that is the process parameter $Si_k$ is represented as a linear combination of the input variables of the model Mi. The coefficients of this linear combination, which are designated by $a_m$, where m is a running index, are the model parameters for the model Mi.

The sets $(B, U, Si)_T$ of measured values supply the conditional equations for the model parameters $a_m$. As the number of sets of measured values is as a rule greater than the number of model parameters $a_m$, the system of conditional equations is over-determined. However, sufficient mathematical methods are known to determine the best possible values for the model parameters $a_m$ by means of the conditional equations. Suitable methods are, for example, methods of balancing calculation (set of conditions), the method of least squares, the method of singular value decomposition (SVD) or principal component analysis (PCA). As such methods are sufficiently well-known, they are not described in more detail here.

The associated model value $(Yi_k)$ is now determined for each set $(B, U, Si)_T$ by means of the model Mi as a linear combination of the processor parameters B, U, Si with the coefficients $a_m$.

The $(Yi_k)_T$ form a set of model values, with $(Yi_k)_T$ being the model value for the component parameter $Si_k$ for the time T. The model values $(Yi_k)_T$ are compared with the actual measured values corresponding thereto for the component parameter $(Si_k)_T$ by difference formation and a respective residual value $r_T$ is determined therefrom. A model error $\epsilon$ is determined from the totality of the residual values $r_T$ and is a measure for the quality of the model Mi. The model error $\epsilon$ can, for example, be the normalised sum of the squares of the residual values.

The model Mi is optimised in the following by determining the model parameters $a_m$ and a respective repeated determination of the model error $\epsilon$ for so long until the model error $\epsilon$ is minimum or falls below a pre-set limit. If this has been achieved, the model Mi is sufficiently good for the monitoring.

The fluctuations of the residual values $r_T$ determined during the learning phase represent how great the deviation of the model value $Yi_k$ typically is from the actual measured value $Si_k$. For this reason, the confidence ranges of the models or the threshold values for the monitoring parameter are preferably determined in the normal operating phase using the residual values $r_T$ determined in the learning phase.

As the models Mi are purely experimental models, the model structures used have, as a rule, no physical significance.

After a model Mi has been prepared and optimised for each sub-system Si using the measured values detected in the learning phase, it is possible to determine a model value $Yi_k$ for the component parameter $Si_k$ for each of those combinations of values of the process parameters B, U, S1, . . . , SN which correspond to a working point from the operating range of the plant 1. Said model value $Yi_k$ indicates in a very good approximation the value the component parameter $Si_k$ would have to have if the plant 1 were working in normal, that is non-malfunctioning, operation. In other words: the models Mi consider the instantaneous working point of the plant 1.

A preferred embodiment for the pre-check 2 is now explained in more detail in the following. This pre-check 2 usually takes place in an evaluation unit which is signal-connected to the sensors for the measured value detection and to a master control device for the plant 1 for the exchange of data. The embodiment is illustrated schematically in FIG. 2. The pre-check 2 comprises the following components: a machine model MA whose input values are operating parameters B and whose output values comprise a machine model value YA for at least one of the operating parameters; a range test 21 in which a check is made as to whether individual operating parameters or combinations thereof are within the range of working points learned in the learning phase; and a test 22 with which the environmental parameters are checked for freedom from malfunctioning.

The machine model MA is essentially based on the same concept as the models Mi for the sub-systems 1i. The machine model MA has operating parameters B as input values and measured values are detected for these by means of the sensors at regular intervals. It is the task of the machine model MA to calculate machine models values for one or more selected operating values and these machine model values are then able to be compared with the corresponding measured values for the operating parameters. It is assumed for reasons of simplicity in the following that the machine model MA calculates a machine model value YA only for exactly one selected operating parameter B. It is, of course, understood that machine model values can be calculated in practice for more than one operating parameter B, for which purpose more than one machine model can also be provided. Machine models YA are expediently calculated using the machine model or the machine models MA for those operating parameters B which are used as input values for the models Mi of the sub-systems 1i.

The operating parameters in electrical terminal power P of the generator and flow rate Q are particularly suitable as output values for the machine model MA for the specific example of a turbine with generator, since P and Q, together with the head of water H, represent the most important operating parameters which are used, as a rule, as input values for each model Mi of the sub-systems 1i.

The machine model MA is prepared for the sub-system, like the models Mi, using measured values which are detected by measurement and stored during the learning phase. Fundamental knowledge of the plant 1 and prior knowledge, for example from model trials, are preferably additionally brought into the machine model MA. The machine model MA is, in distinction to the models Mi, therefore not a purely experimental model, but also takes account of known physical relationships between the operating parameters B and prior knowledge of the plant 1.

A specific embodiment for the implementation of the machine model MA is illustrated schematically in FIG. 3. It serves to check the operating parameter P, which is the electrical terminal power of the generator, for freedom from malfunction. The actual value of the operating parameter P, which is detectable by measurement, is designated with PI and the desired value of P, which is calculated theoretically on the basis of fundamental knowledge and prior knowledge in dependence on operating parameters B, is designated with PS. This desired value PS is calculated theoretically by a module 31. The module 31 can comprise, for example, a physical model. It is also possible for the module 31 to evaluate known physical relationships or empirically determined relationships between the operating parameters or prior knowledge of the plant 1. The module 31 supplies a theoretical desired value PS for the terminal power as a function of the operating parameters of the runner position LA, the guide wheel position LE and the net head of water HN, whose current values are detected by measurement. Further parameters can be considered in this calculation such as the numerical description of the efficiency shell curves $\eta h(LA, LE, HN)$ of the turbine, the efficiency $\eta g$ of the generator and mechanical losses PM.

The difference DP between the actual value PI determined by measurement and the theoretically calculated desired value PS is determined at point 32 in FIG. 3. This difference DP is also an operating parameter B which, in the embodiment described here, serves to check the freedom from malfunction of the operating parameter P.

The difference DP=PI−PS between the actual value PI and the desired value PS can be described at least approximately by a supplementary function $f(LA, LE, HN, PS) \approx PI-PS$ which is dependent on the operating parameters LA, LE and HN. This function f is determined in a model ME. As it can be assumed that the difference DP between the actual value PI and the desired value PS has a similar dependency on the operating parameters to the desired value PS, the following model approach is selected for the function f or the model ME:

$$f = b0 + b1 \cdot LE + b2 \cdot LA + b3 \cdot HN + b4 \cdot PS$$

To obtain an increase in the model quality, it can also be useful to select a model approach which is non-linear in the input values.

The model parameters b0, b1, b2, b3, b4 of the model ME are now determined and optimised in basically the same way as for the models Mi of the sub-systems 1i using the measured values for the operating values B detected in the learning phase for different working points of the plant 1. The model ME is thus an experimental model with which the deviation DP of the operating parameter P from a theoretically determined desired value is modelled.

Many sets $(LE, LA, HN, PI)_T$ of measured values for the operating parameters LE, LA, HN, PI are collected and stored during the learning phase, with the index T indexing the measured value sets $(LE, LA, HN, PI)_T$ which follow one another in time. The module 31 calculates the associated theoretical desired value $(PS)_T$ for each of these sets. The difference $(DP)_T = (PI)_T - (PS)_T$ is thus known from each of the sets (LE, LA, HN, PI) indexed by T by forming the difference from the measured value for the actual power $(PI)_T$ belonging to the index T and the desired value $(PS)_T$ at point 32 in FIG. 3.

Together with the associated value $(PS)_T$, the sets $(LE, LA, HN)_T$ supply the conditional equations for the model parameters b0 to b4. A machine model value $(YA)_T$ for the deviation of the actual value PI of the power from the nominal value PS of the power can then be determined for each index T by means of the function f or the model ME. A deviation parameter $\delta_T$, for example the residual value $\delta_T=(YA)_T-(DP)_T$ (point 33 in FIG. 3) is then determined by respective comparison of the machine model value $(YA)_T$ with the corresponding measured value of the difference $(DP)_T=(PI)_T-(PS)_T$. A model error $\delta$ is determined from the totality of the residual values $\delta_T$, said model error $\delta$ being a measure for the quality of the model ME. The model error $\delta$ can, for example, be the normalised sum of the squares of the residual values.

The model ME is optimised in the following by determining the model parameters b0, b1, b2, b3, b4 and a respective repeated determination of the model error $\delta$ for so long until the model error $\delta$ is minimal or falls below a pre-set limit. If this has been achieved, the model ME is sufficiently good.

The respective current machine model value YA for the difference DP between the power PI detected by measurement and the desired value PS of the power is determined during the operating phase (that is on completion of the learning phase) within the framework of the pre-check 2 using the machine model MA at pre-set time intervals. This machine model value YA is compared with the corresponding current measured value of this operating parameter DP and a residual value RA for the plant 1 is determined therefrom, e.g. by forming a difference (point 33 in FIG. 3). This residual value RA represents a monitoring parameter. If the residual value RA is within a pre-set range, the so-called confidence range, then the operating parameter P is classified as free of malfunction or error. Otherwise, a warning is given such as will be explained further below. The causes of such a warning can be, for example: a malfunction of HN due to contamination of bores and lines or due to an air inclusion; malfunctions of LA or LE; malfunction in the measurement of the power PI; drop in the hydraulic efficiency $\eta h$ or the efficiency $\eta g$ of the generator; too high a bearing power loss, mechanical damage.

Machine models MA can also be prepared in basically the same way for other operating parameters B, in particular for the flow rate Q, using the measured values detected in the learning phase and using fundamental knowledge or prior knowledge of the plant 1. A model (corresponding to the model ME in FIG. 3) is also preferably prepared for the flow rate Q with which a machine model value can be determined for the deviation DQ of the theoretically calculated flow QS from the actual flow QI detected by measurement. This machine model value is then compared with the actual deviation of the theoretical flow from the measured flow, in the same way as is shown in FIG. 3.

It is checked in the range test 21 (see FIG. 2) of the pre-check 2 whether individual operating parameters B or combinations thereof are within the range of working points learned in the learning phase. The range test 21 is primarily intended to prevent unlearned states resulting in residual values which are too high and thus in false warnings. The range test 21 is preferably carried out using a histogram of the dimension d(d=1, 2, 3, . . .) or of a hyper-plane, which is prepared using the measured values for the operating parameters dected in the learning phase. A histogram 5 having the dimension d=3 is shown in FIG. 4 for the example of the three operating parameters LA, LE, HN,. This histogram 5 can be represented as a three-dimensional integer-matrix and comprises a plurality of classes 51 which are represented as cuboids in FIG. 4. Each class 51 corresponds to a combination of the three operating parameters LA, LE, HN, in which either LA or LE or HN respectively are in a certain value range. Each combination of values for LA, LE, HN, can consequently be assigned to one of the classes 51.

During the learning phase and as already mentioned, the plant 1 is operated at a plurality of different working points so that different combinations of the values for the operating parameters LA, LE, HN, also occur. A decision is made for each error-free combination of LA, LE, HN, detected during the learning phase as to which class 51 it is to be assigned to. After the class 51 has been determined, into which the combination of LA, LE, HN, is to be assigned, the probability of the occurrence of a combination belonging to this class is evaluated using the relative frequency of events previously assigned to this class 51 and calculated from the histogram 5.

It is therefore possible to determine the probability of an event, that is a combination of LA, LE, HN, which belongs to class 51, occurring after the termination of the learning phase by using the histogram 5 for each class 51.

It is now checked in the operating phase, after the measurement of the operating parameters LA, LE, HN, using the histogram 5, how large the probability for this combination of operating parameters LA, LE, HN, is. If the probability of this combination is below a pre-settable limit, a decision is made that it is an unlearned state which is outside the permitted range of working points for the plant 1. The subsequent evaluation of the models Mi for the sub-systems 1i is suppressed for this measurement.

Furthermore, the range test 21 can comprise a single range test which also serves to avoid false warnings. In this single range test a check is made whether the single measurement of an operating parameter B is within its specific measurement range which is fixed by a minimum and a maximum value. These minimum and maximum values are stored, for example, in the evaluation unit.

The single range test is used above all in order to check whether a measurement is within the measuring range of the sensor or whether the measured value is physically possible. Error functions of the sensors, due, for example, to a cable break can be detected in this way. The single range test can also be carried out by the governing control device and the result communicated to the evaluation unit. Monitoring devices for the sensors, which are already provided in the plant 1, can also be used for the single range test.

The possibility also exists within the framework of the range test 21 to carry out a model range test. For this purpose, working ranges are fixed for individual models or all models and it is checked in each case whether the input values of the respective model are within the associated working range.

The test 22 (see FIG. 2) of the pre-check 2 serves to check the environmental parameters U for freedom from malfunction. This test 22 is preferably realised by redundant measurement of the environmental parameters U, for example by an environmental parameter U being determined with a plurality of sensors which are independent of one another. Furthermore, the test 22 for the environmental parameters U can also comprise single range tests—similar to the way described above—with it being checked whether the respectively detected measured values are physically meaningful and/or are within a specific measuring range.

Further components such as, for example, input filters to filter the input values and/or residual value filters to filter the residual values can be implemented in the pre-check 2 in addition to the components described above. Furthermore, the different models prepared using the measured values detected in the learning phase can be checked for instability in their preparation. This can be done, for example, by the position of the pole positions (asymptotic limits) of the transmission function of the respective model being checked. Other stability tests known per se are naturally also applicable to the different models.

The measured values for the component parameters S1, ..., SN, which are specific to the sub-systems 11, ... 1N, can also be checked in each case as to whether they are within their specific measurement range or are physically meaningful, as part of the method in accordance with the invention. Faults in the sensors with which the measured values for the component parameters S1, ..., SN are determined can, for example, be detected and localised in this way.

The monitoring of the plant 1 with the embodiment of the method in accordance with the invention described here is now explained in the following, with reference only being made to the operating phase, that is the learning phase is over and the different models Mi, MA, ME are prepared and optimised. The models Mi, MA, ME no longer learn during the operating phase in this embodiment.

Respective measured values are detected for the process parameters B, U, S1, ..., SN at pre-settable time intervals during the operating phase of the plant 1. They are compared with model values or with machine model values in order to determine the current values for the monitoring parameters therefrom. A plurality of monitoring parameters is preferably determined which in each case represents a residual value indicating the deviation of the model value or of the machine model value from the current measured value corresponding thereto.

In the embodiment described here, the residual values which serve as monitoring parameters are the residual values $Ri_k$ (i=1, 2, ..., N) which result from the comparison of the model values $Yi_k$ determined using the models Mi for the sub-systems 11, ... 1N and the corresponding measured value for the component parameter $Si_k$. The index k here indexes that component parameter $Si_k$ from the component parameters Si of the sub-system 1i, for which the residual value $Ri_k$ is determined, which is therefore the output value of the model Mi for the sub-system 1i. The residual value or residual values Ra determined as part of the pre-check 2 using the machine model MA or the model Me and indicating the difference between the machine model value YA and the measured value for the corresponding operating parameter B further serve as the monitoring parameters. As already explained above, the operating parameters B, which are monitored with machine models MA, for the turbine with generator are preferably the difference DP between the actual value PI and the desired value PS of the electrical terminal power P and the difference between the actual value and the desired value of the flow rate Q.

As the models Mi, MA, ME are designed such that they follow the working point changes of the plant 1, the monitoring parameters $Ri_k$ and RA are independent of the respective current working point.

After the current measured values have been determined for the process parameters B, U, Si, ..., SN, it is first checked, as described above, in the pre-check 2, whether the measured values for the process parameters B, U, Si, ..., SN are within their respective specific measurement ranges and are physically meaningful. It is checked for the environmental parameters U whether the redundant measurements are compatible to one another (test 22, FIG. 3). It is further checked whether the operating parameters are within the range of working points learned in the learning phase (range test 21, FIG. 3). Then the residual value or the residual values RA are determined using the machine model MA.

The models Mi for the sub-systems 1i are evaluated only when the pre-check 2 has been completed. Only such models Mi are permitted or considered which have only malfunction-free environmental parameters U and operating parameters B or already validated, that is classified as free of error, component parameters S1, ..., SN as input values. The residual values $Ri_k$ are then determined with these models Mi. It is thus ensured that the residual value $Ri_k$ determined is free from the influences of potential malfunction of the input values of the model Mi. An abnormal course of the residual value $Ri_k$ can thus be clearly ascribed to a possible malfunction of the input value Mi—that is to a component parameter Si. The localisation of malfunctions is substantially simplified in this way.

A preferred embodiment of the monitoring concept is now described in the following which is also suited in particular for the early recognition of malfunctions and the scheduling of maintenance work, with a plurality of categories being used for the monitoring into which the process parameters can be classified in dependence in each case on their current values or the current value of the associated residual value. At least a category OK for the normal operating state, a category EW for an early warning, a category WW for a wear warning, a category UN for unknown states and a category SW for a signal warning are provided.

A respective confidence range is fixed for each of the residual values $Ri_k$, RA, that is threshold values are determined for the residual values $Ri_k$, RA where the associate residual value is evaluated as no longer normal if they are exceeded or not reached. These confidence ranges or thresholds are preferably fixed using those residual values or their fluctuations which were determined for the associated model Mi, MA, ME in the learning phase, since the residual values or their fluctuations determined in the learning phase represent a typical measure for how great the deviations of the model value $Yi_k$ or of the machine model value YA are from the corresponding measured value in the normal, non-malfunctioning operating state. The threshold value for the residual value $Ri_k$, RA can, for example, be selected to be equal to or somewhat greater than the largest of the residual values determined in the learning phase for the corresponding model Mi, ME.

If it is found, for example, as part of the pre-check 2 or if it is advised by the master control device that the current measured value for a process parameter B, U, S1, ... SN is outside the respective specific measuring range or is not physically meaningful, then the corresponding process parameter B, U, S1, ..., SN is classified in the category SW for the signal warning, a signal warning is stored for this process parameter and made visible on the output unit 4 (FIG. 1). All models MA, ME or Mi, for which the faulty process parameter is the input value, are ignored in this cycle, that is are no longer evaluated.

The category UN for unknown states characterises such a state at which an evaluation of the corresponding residual value is omitted due to too great an uncertainty with respect to the reliability of the residual values $Ri_k$, RA. The category UN is selected in the following cases: one of the input values of a model Mi is classified in the category EW (see further below) as part of the pre-check 2; or it is detected during the pre-check 2 that the redundant measurements for one or more of the environmental parameters U are not compatible with one another; or the range test shows that operating parameters B or combinations of operating parameters B are not within the range of working points learned in the learning phase. If a process parameter is classified in the category UN during a cycle, then all models MA, ME or Mi, for which the faulty process parameter is the input value, are ignored in this cycle, that is are no longer evaluated. If a process parameter is classified in the category UN, then this is stored and made visible on the output unit 4 (FIG. 1).

The category EW for early warning is selected when a residual value $Ri_k$ or RA is outside its confidence range. This can have several reasons: for example, sensor damage may be present or it can be a case of suddenly occurring damage, or it can be a case of a slowly progressing change such as is caused, for example, by wear or abrasion. The latter reveals itself by a comparatively slow and continuous change in the time-dependent course of the corresponding residual error RA or $Ri_k$ and can therefore be easily distinguished from suddenly occurring damage or errors. If a slowly progressing change is the cause for the leaving of the confidence range, then the operator has the possibility of increasing, that is of enlarging, the confidence range for the corresponding residual value Ra or $Ri_k$. This measure automatically has the consequence that that process parameter which is monitored by this residual value RA or $Ri_k$ is classified in the category WW for wear warning. If the residual value is within the new confidence range after the increase of the confidence range, then the associated process parameter remains in the category WW. After a time period dependent on the wear, this process parameter will again enter the category EW, whereby the operator's attention is drawn to the worsening wear. The category WW is not used in the learning phase. The occurrence of the categories EW and WW for a process parameter is stored and made visible on the output unit 4. Furthermore, the occurrence of category WW is stored separately so that it can be determined, if category EW occurs again, whether the confidence range has already been changed once for the corresponding residual value.

The threshold values for the category EW are preferably chosen such that they are well below a critical level where serious damage could result if they were exceeded.

Those process parameters B, U, S1, ..., SN which do not belong to any of the categories SW, UN, EW or WW are classified in the category OK for the normal operating state. This is the case, for example, if the residual value $Ri_k$, with which the component parameter $Si_k$ is monitored, is within its confidence range and, furthermore, if no error has occurred during the pre-check 2 and the residual value(s) RA for those operating parameters B which are input values for the model Mi associated with $Si_k$ are within their confidence range. The occurrence of the category OK is also stored and made visible on the output unit 4.

The monitoring concept with the different categories, in particular with the categories EW and WW, has the advantage that wear phenomena are recognisable at a very early stage and thus that servicing or maintenance work can be scheduled and organised in good time.

The selection of the suitable process parameters and the choice of the input and output values of the different models for the method in accordance with the invention depend on the respective plant which is to be monitored. It is the responsibility of one skilled in the art to select the suitable process parameters for the respective application.

We claim:

1. A method for the monitoring of a plant having a plurality of sub-systems which is operable at variable working points and comprising the following steps:
   a) respective measured values are detected for a fixed set of process parameters (B, U, S1, ..., SN) at pre-settable time intervals during the operation of the plant (1);
   b) the measured values detected in a learning phase for different working points are used to prepare models (M1, M2, ..., MN) for the operating characteristics of the sub-systems (11, 12, ..., 1N), with the input values of each model (M1, M2, ..., MN) being at least a part of the process parameters (B, U, S1, ..., SN) and the output value of each model comprising a model value (Yi, $Yi_k$) for at least one of the process parameters, and with the models (M1, M2, ..., MN) being optimised by comparing the model values with the measured values;
   c) at least one monitoring parameter (Ri, $Ri_k$), which is independent of the respective current working point, is determined at pre-settable time intervals in an operating phase using the models (M1, M2, ..., MN);
   d) the time-dependent course of the monitoring parameter (Ri, $Ri_k$) is used for the monitoring of the plant (1); characterised in that a pre-check (2) is carried out prior to the determination of the monitoring parameter (Ri, $Ri_k$), in which a check is made whether at least the measured values for those process parameters which are operating parameters (B) are within a predetermined range.

2. A method in accordance with claim 1 wherein a machine model (MA) is determined for the pre-check (2), the input values of said machine model (MA) being operating parameters (B) and its output values comprising a machine model value (YA) for at least one of the operating parameters (B).

3. A method in accordance with claim 2 wherein the machine model (MA) comprises at least one model (ME) with which a machine model value (YA) is determined for the deviation (DP; DQ) of the measured value (PI; PQ) for an operating parameter (P; Q) from a theoretically determined desired value (PS; QS) for said operating parameter (P; Q).

4. A method in accordance with claim 3 wherein the model (ME) for the deviation (DP; DQ) of the measured value (PI; PQ) from the theoretically determined desired value (PS; QS) is an experimental model, which is prepared and optimised on the basis of the measured values detected in the learning phase.

5. A method in accordance with claim 2 wherein the machine model (MA) is prepared using the measured values detected in the learning phase for different working points, with a deviation value being determined by comparing the machine model value (YA) with the actual measured value corresponding thereto, and model parameters of the machine model (MA) being optimised such that a model error determinable from the deviation values becomes minimal.

6. A method in accordance with claim 2 wherein a residual value (RA) is determined for the plant during the operating phase by a comparison of the machine model value (YA) with the corresponding current measured value of said operating parameter (B).

7. A method in accordance with claim 1 wherein the environmental parameters are examined for freedom from malfunction during the pre-check (2).

8. A method in accordance with claim 1 wherein the pre-check (2) comprises a range test (21) in which an examination is made as to whether individual or combinations of operating parameters (B) are within the range of working points learnt in the learning phase.

9. A method in accordance with claim 8 wherein the range test (21) is carried out by means of a histogram (5) which is prepared using the measured values detected in the learning phase.

10. A method in accordance with claim 1 wherein a plurality of monitoring parameters is determined, each of which is a residual value (Ri, Rik, RA) which identifies the deviation of a model value (Yi, Yik) or a machine model value (YA) from the current measured value corresponding thereto.

11. A method in accordance with claim 1 wherein a plurality of categories is used for the monitoring, the process parameters being capable of being classified therein in each case in dependence on their current value, with there at least being provided a category for the normal operating state, a category for an early warning, a category for a wear warning, a category for unknown states and a category for a signal warning.

12. A method in accordance with claim 1 wherein a confidence range is fixed at least for one monitoring parameter (Ri, Rik, RA), said confidence range being able to be extended if the monitoring parameter leaves the original confidence range, and the extension of the confidence range is registered.

* * * * *